United States Patent [19]

Oo et al.

[11] Patent Number: 5,717,592
[45] Date of Patent: Feb. 10, 1998

[54] METHOD AND SYSTEM FOR ENGINE THROTTLE CONTROL

[75] Inventors: Kah Seng Oo, Farmington Hills; Charles Francis Weber, South Lyon; Darrel Alan Recker, Belleville; Paul Michael Suzio, Livonia, all of Mich.

[73] Assignee: Ford Motor Company, Dearborn, Mich.

[21] Appl. No.: 554,178

[22] Filed: Nov. 6, 1995

Related U.S. Application Data

[63] Continuation-in-part of Ser. No. 308,790, Sep. 19, 1994, Pat. No. 5,489,845.

[51] Int. Cl.$^6$ ..................................................... B60K 41/00
[52] U.S. Cl. ........................... 364/426.031; 364/426.029
[58] Field of Search ....................... 123/399; 364/426.031, 364/426.029; 318/568.16, 577, 603, 608, 640, 652, 683

[56] References Cited

U.S. PATENT DOCUMENTS

| | | | |
|---|---|---|---|
| 3,878,445 | 4/1975 | Kirkham et al. | 318/308 |
| 4,078,191 | 3/1978 | Morters et al. | 318/227 |
| 4,272,715 | 6/1981 | Matsumoto | 318/800 |
| 4,461,994 | 7/1984 | MacDonald | 324/174 |
| 4,491,775 | 1/1985 | Harvey et al. | 318/434 |
| 4,712,186 | 12/1987 | Fromme | 364/565 |
| 4,740,738 | 4/1988 | El-Antably et al. | 318/701 |
| 4,860,708 | 8/1989 | Yamaguchi et al. | 123/399 |
| 4,943,760 | 7/1990 | Byrne et al. | 318/701 |
| 4,961,038 | 10/1990 | MacMinn | 318/696 |
| 4,991,301 | 2/1991 | Hore | 33/366 |
| 5,074,267 | 12/1991 | Ironside et al. | 123/399 |
| 5,107,213 | 4/1992 | Ponticelli et al. | 324/207.25 |
| 5,113,824 | 5/1992 | Haubner | 123/399 |
| 5,115,396 | 5/1992 | Keegan | 364/431.04 |
| 5,184,056 | 2/1993 | Brune et al. | 318/799 |
| 5,193,506 | 3/1993 | Ironside et al. | 123/399 |
| 5,195,038 | 3/1993 | Yagi et al. | 364/431.05 |
| 5,216,916 | 6/1993 | Bederna et al. | 73/118.1 |
| 5,281,903 | 1/1994 | Oku et al. | 318/701 |
| 5,306,993 | 4/1994 | de Fries et al. | 318/561 |
| 5,391,127 | 2/1995 | Nishimura | 477/110 |
| 5,394,954 | 3/1995 | Tashiro et al. | 180/178 |
| 5,410,234 | 4/1995 | Shibata et al. | 318/700 |
| 5,410,235 | 4/1995 | Ehsani | 318/701 |
| 5,428,282 | 6/1995 | Johnson | 318/701 |
| 5,433,283 | 7/1995 | Shultz et al. | 180/197 |
| 5,489,845 | 2/1996 | Weber et al. | 324/207.25 |
| 5,513,611 | 5/1996 | Ricouard | 123/399 |

FOREIGN PATENT DOCUMENTS

| | | |
|---|---|---|
| 0346764 | 8/1989 | European Pat. Off. . |
| 2293654 | 3/1996 | United Kingdom . |

Primary Examiner—Kevin Teska
Assistant Examiner—Stephen J. Walder, Jr.
Attorney, Agent, or Firm—Peter Abolins; Roger L. May

[57] ABSTRACT

A method and system are provided for positioning a gasoline engine throttle in response to an angular position input command signal. A multi-phase variable reluctance motor positions the throttle in response to motor current commands from a micro-controller. The micro-controller receives and processes the position input command and throttle position feedback signals from a multi-phase variable inductance position encoder rotatably coupled with the motor shaft. The motor current command are obtained from look-up tables that are derived from empirical data of the motor. The motor current command tables are a mapping from motor rotor position and desired motor torque to desired motor currents in the appropriate phases of the motor to hold the load.

5 Claims, 8 Drawing Sheets

METHOD AND SYSTEM FOR ENGINE THROTTLE CONTROL

CROSS-REFERENCE TO RELATED APPLICATION

This application is a continuation-in-part of patent application Ser. No. 08/308,790, filed Sep. 19, 1994 now U.S. Pat. No. 5,489,845, entitled "Encoder System And Method For Determining Absolute Rotor Position", which has at all times relevant hereto been commonly owned, and the details of which are hereby incorporated by reference.

TECHNICAL FIELD

This invention relates to a method and system for electronic throttle control in vehicular applications.

BACKGROUND OF THE INVENTION

The continuing evolution of the microprocessor has permitted increasingly sophisticated vehicular control systems. Improvements in hardware, including greater memory capacity and faster operating speeds, have facilitated implementation of complex control strategies. In particular, engine control strategies have become more sophisticated to accommodate the various conditions encountered during normal engine operation.

One particularly challenging control function is that of idle speed control (ISC). A number of constraints are placed on the control of engine idle speed, including maintaining satisfactory fuel economy, meeting emissions requirements, and maintaining acceptable driveability. Variations in idle speed are particularly noticeable to vehicle occupants since the engine is operating at a relatively low speed and external distractions, such as road noise or wind noise, are typically negligible or minimal. Furthermore, the low operating speed of the engine produces a relatively low amount of available power at a time when accessory load may be at its highest level.

Also, in an effort to produce automobiles which are lighter and more efficient, automotive designers continue to seek ways to utilize smaller displacement engines without sacrifice in power. Typically, this requires a large throttle body to support the increased volume of air these small high performance engines use.

The problem encountered by this approach, however, is that it is exceedingly difficult to control idle on small displacement engines which are very sensitive to throttle plate position. This problem has been addressed by those skilled in the art through the use of air bypass valves which are separate pieces of hardware used for fine tuning. As its name explains, the air bypass valve literally bypasses the throttle plate to allow the engine to be more easily controlled at idle. As readily seen, this prior art approach inherently introduces a new component which increases the manufacturing and labor costs of the vehicle and which ultimately must be passed on to the consumer.

Consequently, a need has developed for a method and system for making fine adjustments to throttle position— particularly at the idle range—without the introduction of additional hardware. Such a method and system should be particularly suited to measuring throttle position and responding to changes in operating condition in order to change or maintain the present throttle position in accordance with a desired throttle position. Such a system should not require the use of additional hardware or contacting elements which will add additional expense or wear out.

SUMMARY OF THE INVENTION

Thus, it is an object of the present invention to provide a method and system for controlling engine throttle plate position.

It is another object of the present invention to provide such a method and system wherein the throttle plate positioning controller issues current commands based on the present throttle position and the torque necessary to maintain a desired or commanded throttle regardless of the load on the throttle plate.

In carrying out this object and other objects and features of the present invention, a system and method are provided for positioning a gasoline engine throttle in response to angular position commands from an engine computer or from manual actuation of the accelerator pedal. A multiphase variable reluctance motor positions the throttle in response to motor current commands from a microcontroller that receives and processes throttle position feedback signals from a multi-phase inductance position encoder rotatably coupled with the motor shaft.

A more complete understanding of the present invention will be readily appreciated by one of ordinary skill in the art from the following detailed description of the best mode for carrying out the invention when taken in conjunction with the accompanying drawings.

BEST MODE FOR CARRYING OUT THE INVENTION

Figure 1:
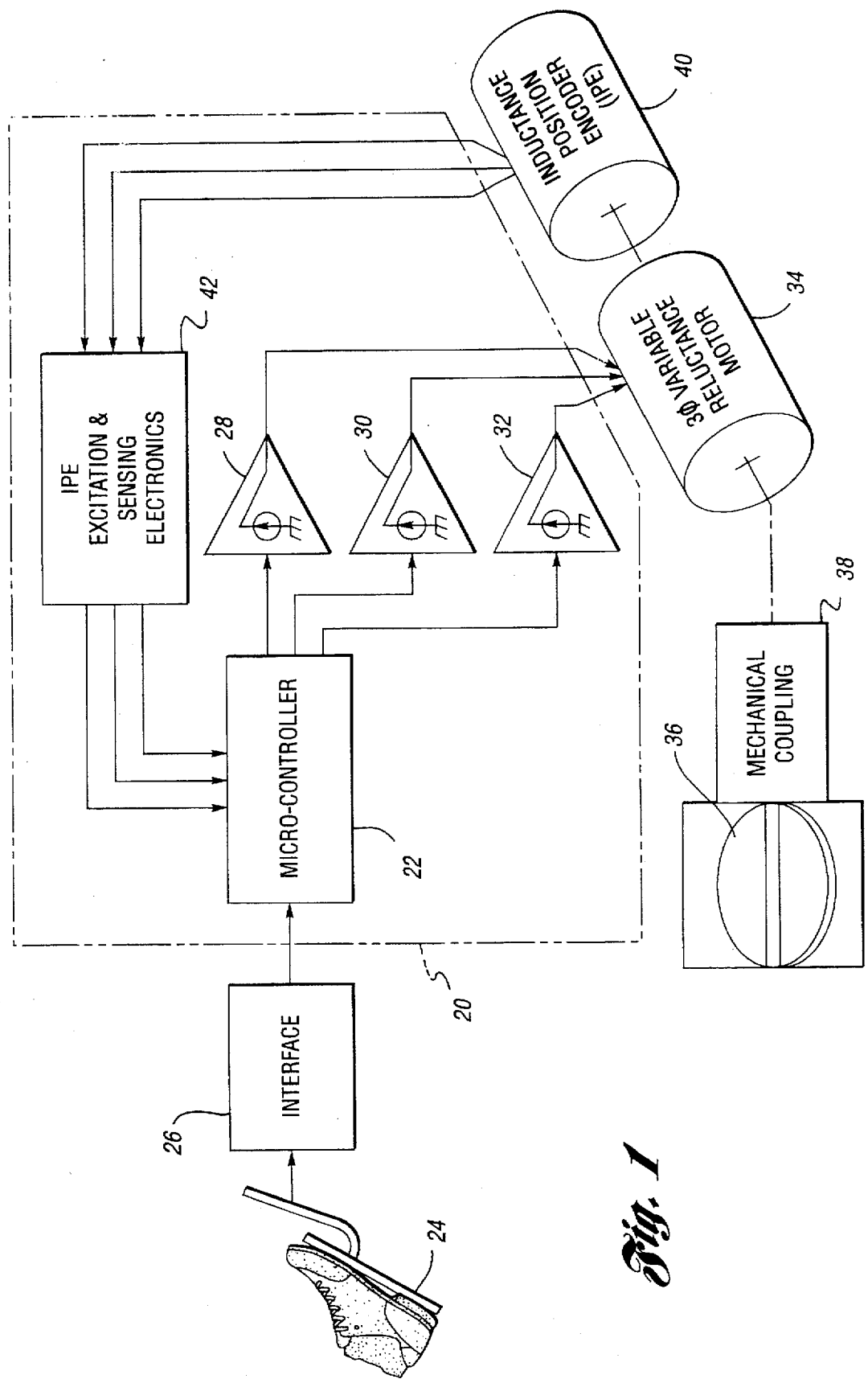
FIG. 1 is a block diagram of an engine throttle control system according to the present invention.

Referring now to FIG. 1, a block diagram illustrating an electronic throttle control system according to the present invention is shown. The control system, indicated generally by reference numeral 20, includes a microprocessor-based electronic controller 22 which contains memory for storing various calibration parameters and engine operating parameters, and control logic. As is known, the control logic within controller 22 may utilize a variety of hardware and software to carry out various control functions and strategies. For example, the control logic may include program instructions which are executed by a microprocessor, in addition to dedicated electronic circuits which perform various functions such as signal conditioning and the like.

The position of the accelerator pedal 24 is detected by a suitable sensor (not shown), processed in interface circuitry 26, and provided as input to the micro-controller 22. Micro-controller 22 generates signals for setting the output current level of constant current amplifiers 28, 30, and 32. Amplifiers 28, 30, and 32 drive magnetic coils within a variable reluctance (VR) motor 34 to produce a torque for setting the position of the engine throttle plate 36. Amplifiers 28, 30, and 32 are preferably the type having two quadrant drive ability. Two quadrant operation allows positive and negative voltage potentials to exist on the motor coils, providing wider frequency bandwidth over single quadrant amplifiers. The throttle plate is spring biased which places a load on the plate. Air flow places an additional load on the plate. A mechanical coupling 38 transfers the VR motor torque to the throttle plate and may be used for mechanical torque advantage if desired.

A variable inductance position encoder (IPE) 40, is rotatably connected to the shaft of the VR motor 34. The rotatable connection between the VR motor 34 and IPE 40 allows the IPE excitation and sensing electronics 42 to provide multi-phase position feedback signals to micro-controller 22 indicative of the rotor position of the motor 34. The IPE 40 is constructed with the same number of phases and similar internal structure to the VR motor. The IPE is aligned with the VR motor to produce signals synchronous with the motor torque characteristics. The IPE and VR motor can be easily and relatively inexpensively manufactured due to the same compatible technology. Further structural details of the encoder and motor may be had from the aforementioned patent application.

Figure 2:
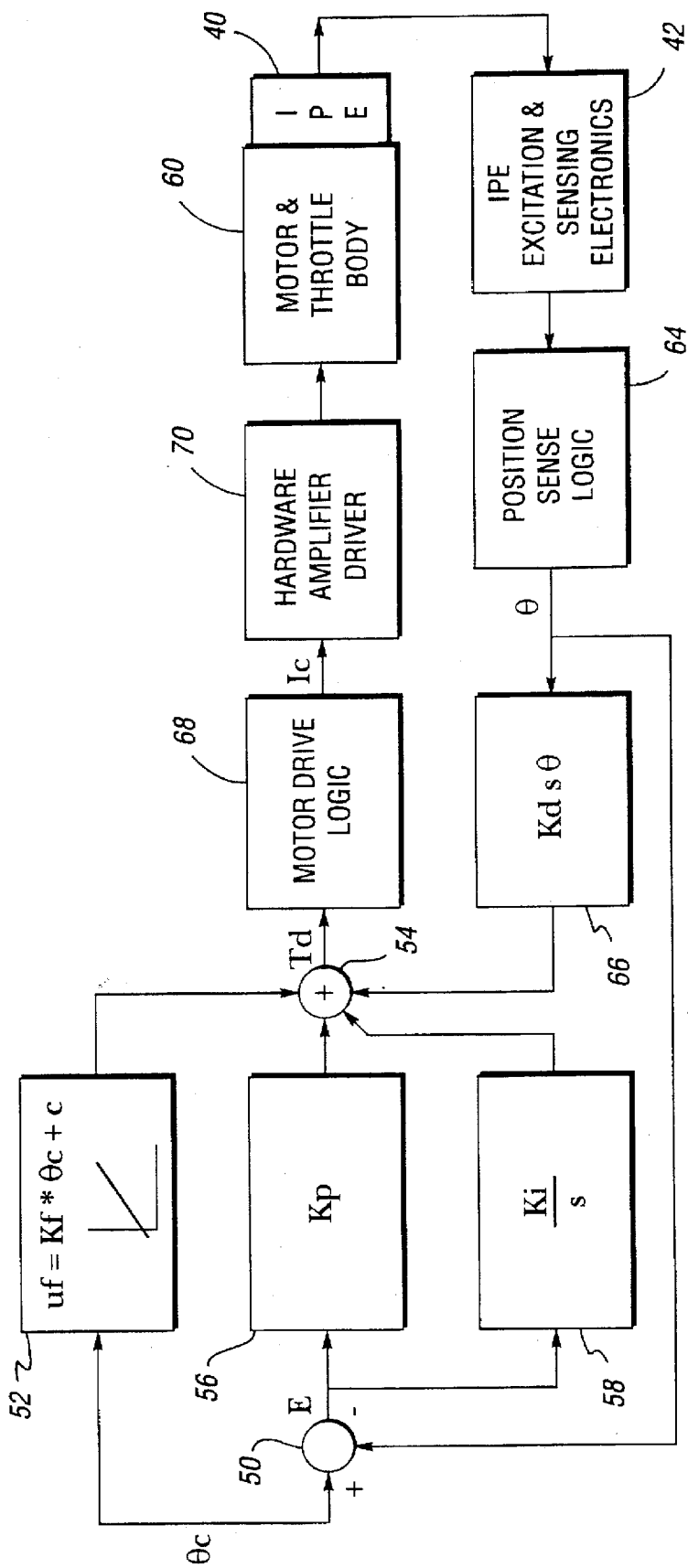
FIG. 2 shows the basic blocks of the feedback control employed in the system of FIG. 1.
Figure 3:
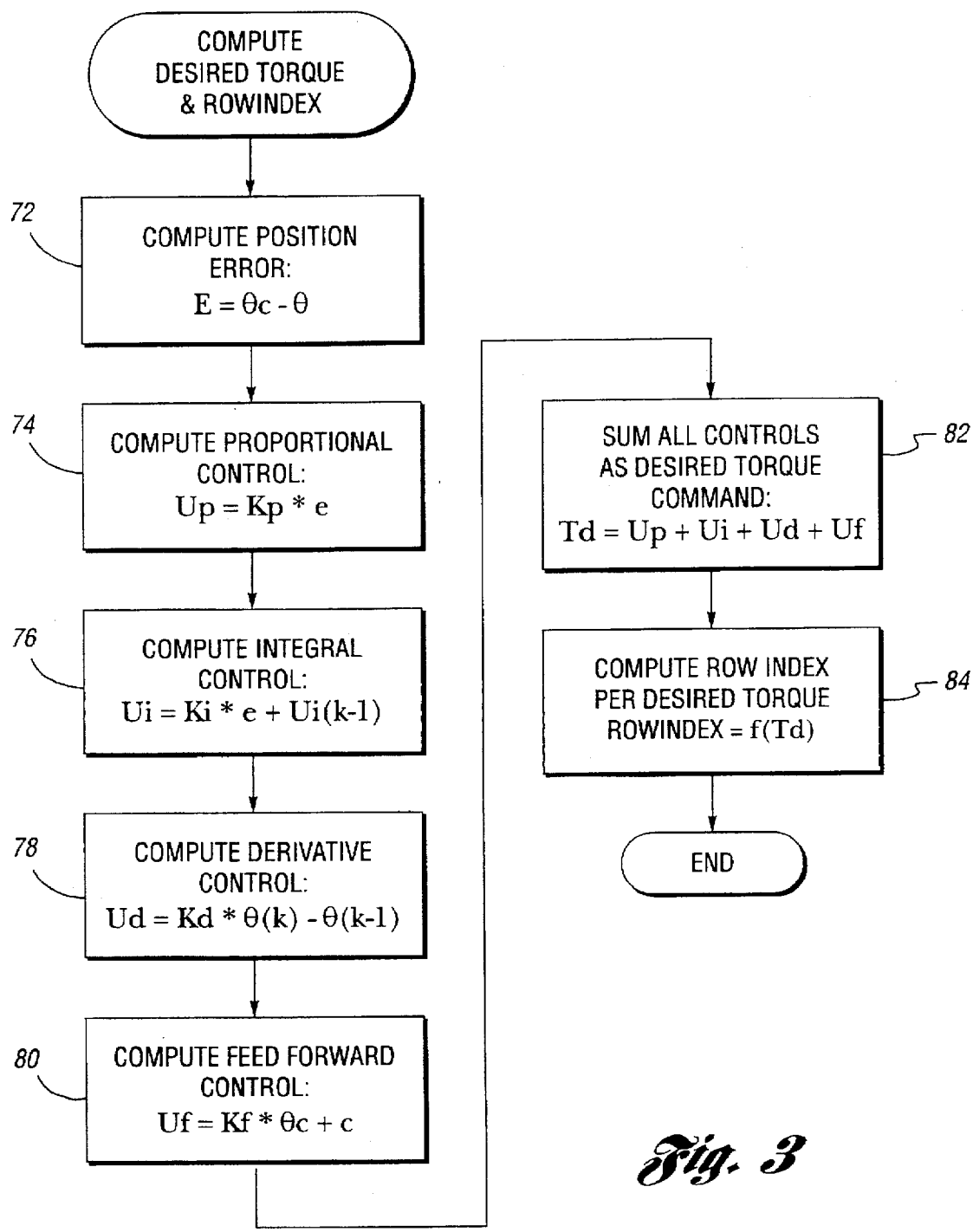
FIG. 3 is a flowchart depicting a method of computing desired motor torque for use as a row index in a motor current look-up table.

FIG. 2 shows the basic blocks of the feedback control system implemented within the micro-controller 22. A target throttle plate position, or motor position command, $\theta_c$ is input to the controller 22 from the accelerator pedal position sensor. $\theta_c$ may also be an idle speed command from an engine computer on the vehicle. The present position $\theta$ of the throttle body 60, detected by the IPE electronics 42 and logic 64, is input to a summer 50. The controller 22 computes a position error, $E=\theta_c-\theta$, as indicated at the output of the summer 50. $\theta_c$ is also fed to a feed-forward block 52 which computes a feed-forward control signal that is input to a summer 54. The position error E is input to proportional and integral blocks 56 and 58 respectively that produce proportional and integral control signals to the summer 54. $\theta$ is also input to derivative control block 66, the output of which is provides another input to the summer 54. The output of summer 54 is the Desired Torque, $T_d$, to move the motor rotor to the commanded throttle position. $T_d$ is provided to logic 68, along with present motor position information. The logic 68 develops a control current $I_c$ that is provided to motor current drivers indicated by the block 70 in order to drive and commutate the motor 34. The system implements a classical PID (proportional-integral-derivative) control law for converting position error into a desired motor torque as further indicated by the blocks 72–82 in the flowchart of FIG. 3. After all control inputs are summed at 82 to produce the desired torque number, $T_d$ is converted to a row index number, $R_i$, as indicated at 84. As will be discussed in connection with FIGS. 7a and 7b, $R_i$ is combined with a column index, $C_i$, computed from the present motor position information, to access motor current command tables, $I_m$ and $I_s$, stored in memory in the controller 22.

Figure 4:
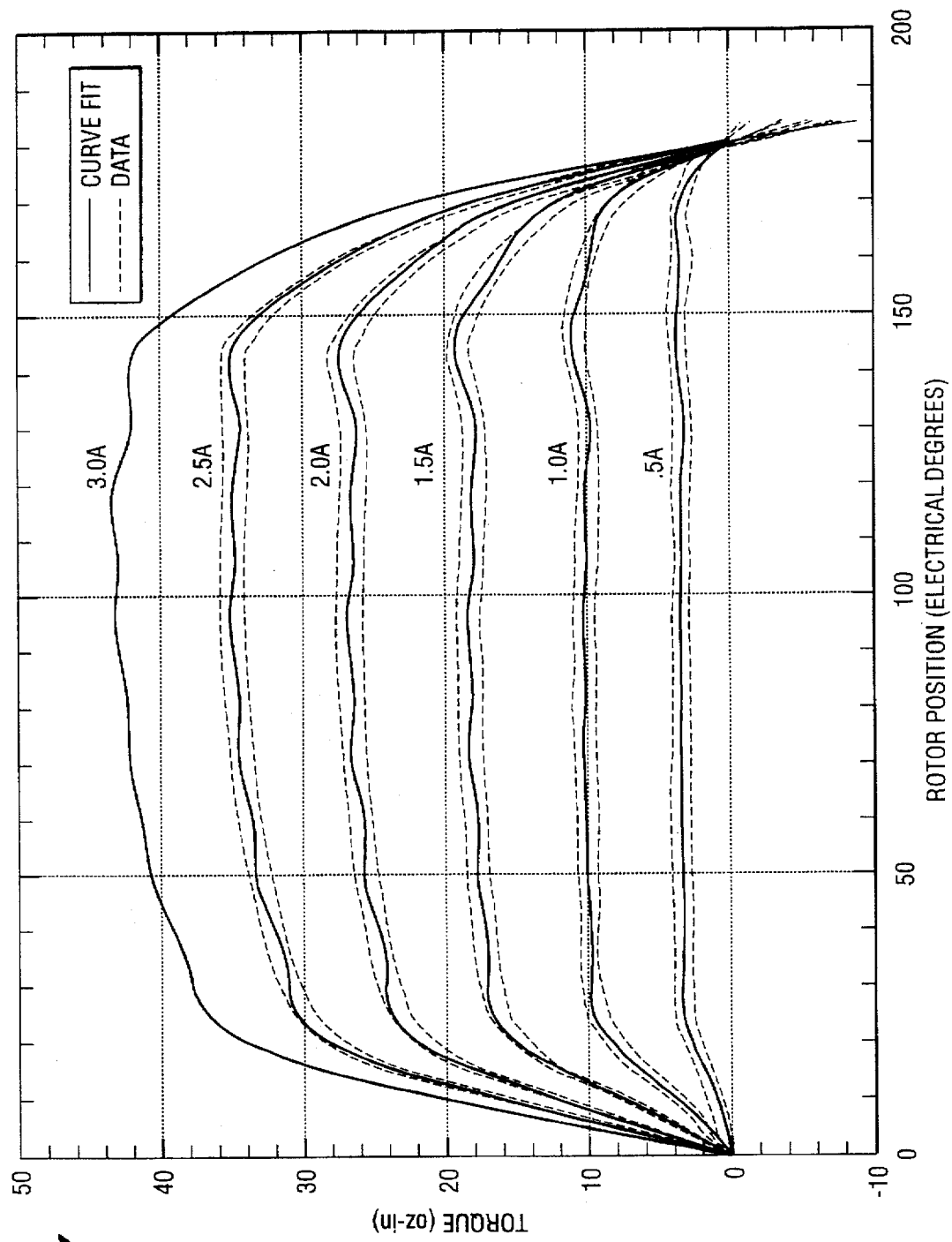
FIG. 4 shows a plot of motor rotor position vs. motor torque for several motor current levels.

The motor current command tables are derived from empirical data of the motor 34. The motor current command tables are a mapping from motor rotor position, $\theta$, and desired motor torque, $T_d$, to desired motor currents, $I_m$ and $I_s$, in a main phase and a secondary phase respectively of the variable reluctance motor 34. These tables will change as the motor design is changed. The motor is assumed to be symmetric about its three phases and a single set of tables is created for all three phases. The process used to generate the table of desired motor phase currents will now be described with reference to FIGS. 4, 5a and 5b. The first step in this process is to model the motor torque as a function of rotor position and current in one phase. Data is collected by fixing the phase current and sweeping through the rotor angles of 0 to 180 electrical degrees while logging the torque produced at these angles. Data is also collected while sweeping from 180 to 0 electrical degrees to help eliminate any bias due to torque hysteresis in the test set-up. This process is repeated for several current levels. As shown in FIG. 4, this data is fitted to a nonlinear analytical model of the torque profile via a least-squares fit for several current levels.

Figure 5A:
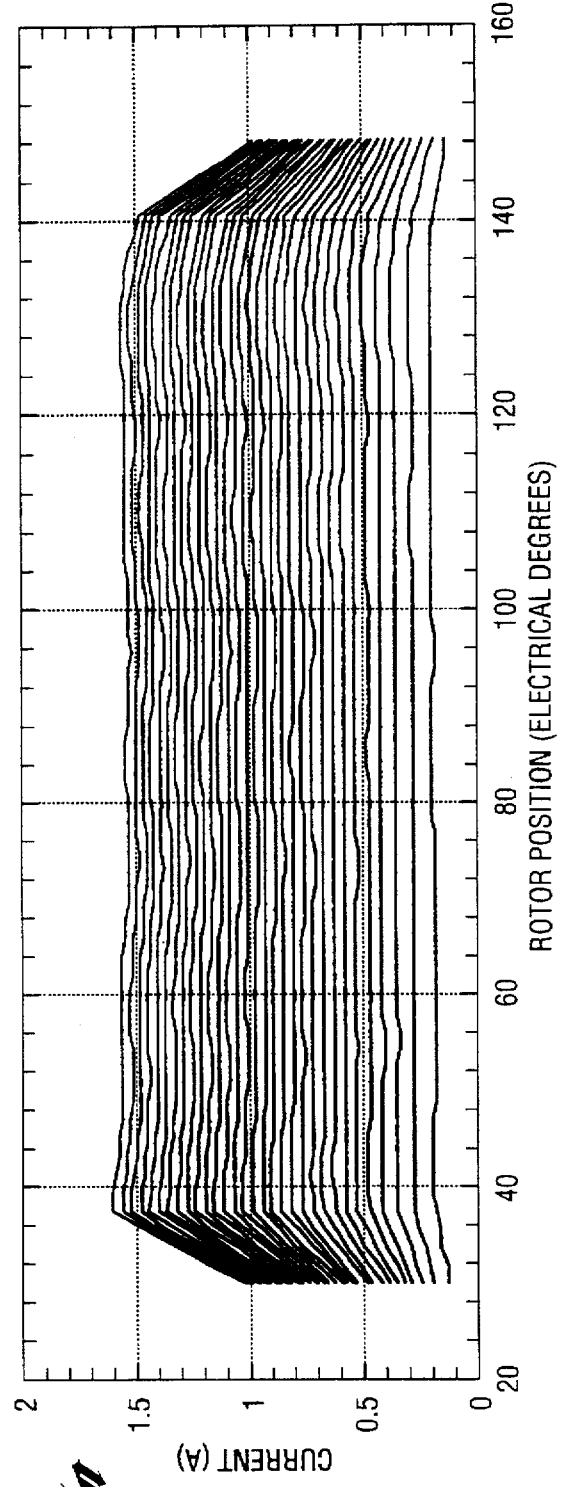
FIGS. 5a and 5b show a plot of the desired main and secondary motor currents as a function of rotor position for different desired torques.
Figure 5B:
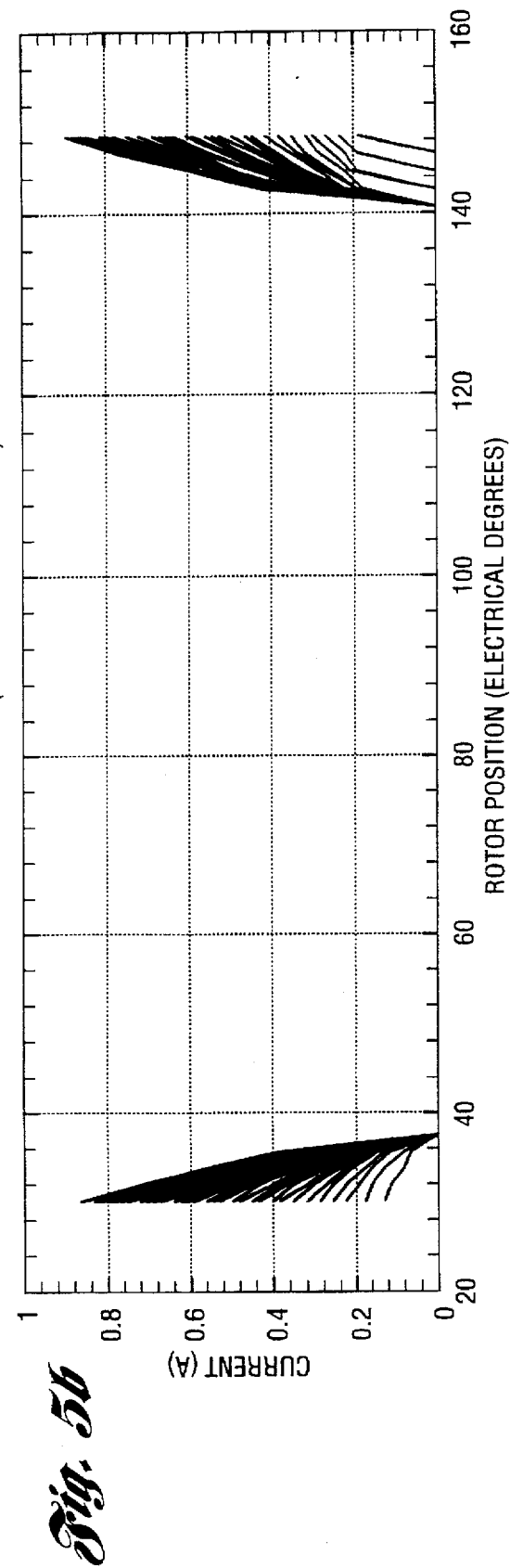

The next step is to invert the model of the torque profile of FIG. 4 so that for a given rotor position and desired torque the correct current is calculated. This inversion is shown in FIG. 5a. Near the region where switching from one phase to the next phase occurs, an overlap region is calculated. In this region, shown in FIG. 5b, the desired currents for two phases are calculated so that the desired resultant torque is produced. In the overlap region, the desired torque from a phase is varied from 0 to 100% of the total desired torque (or 100 to 0% for the other phase). This variation is linear with respect to the rotor position. By implementing this overlap region where desired torque of a phase is ramped up (or down), smoother desired current signals are obtained. To generate the desired current for a given rotor position and desired torque, the desired current is chosen so as to minimize the difference between the desired torque and the resultant torque as calculated by the fitted analytical model. FIGS. 5a and 5b show plots of the desired current as a function of rotor position for different desired torques. The top plot (FIG. 5a) shows the desired current for the most efficient torque producing phase or "main" phase. The bottom plot (FIG. 5b) shows the desired current for the "secondary" phases to the "left" or "right" of the "center" phase and shows how the desired current is varied in the overlap region of the phases. The current values are quantized to some resolution. Tables for the main phase current $I_m$ and secondary phase current $I_s$ are then derived from the center and left/right maps. These tables provide a mapping from rotor position and desired torque to desired currents in the motor phases and are stored in the memory of controller 22.

The IPE 40 comprises a magnetic salient pole rotating structure, i.e., a rotor which is free to turn inside or outside of a arrangement of stationary coils forming the stator. The number of poles in the rotor structure is not the same as the number of poles in the stator structure and as a result, the combination produces a vernier effect. The IPE may closely resemble the structure of the variable reluctance or stepper motor but such resemblance is not required. In the preferred embodiment, the winding connection arrangement is three-phased with two coils connected in series in each phase. The IPE electronics 42 extracts inductance values as the encoder shaft rotates. Three pseudo-sinusoidal signal waveforms represent the three inductance values as position phases A, B and C, in FIG. 6. To achieve high resolution and to increase the computation efficiency, only the near linear regions are used. Line sections a–b, b–c, etc. are linearized into slopes ($m_i$) and offsets ($c_i$) during a calibration process and stored in slope/offset tables in the memory of controller 22. The fine motor rotor angular position units, $\theta_1$ within a step, is computed as:

$\theta_l = m_i * L_m + c_i$ where $L_m$ is the middle value of the three inductance values Each encoder phase is assigned a value of 0, 1 and 2 representing phases A, B and C respectively. The y-axis defined by points, a to b to c, is considered a step i (which is also used as an index to the slope/offset tables). When the rotor moves through points a, b, and c to section c–d, the step i and high position ordinance value $\theta_h$ are incremented. When the rotor moves in the opposite direction, the step and the high position ordinance value are decremented. The total rotor position, $\theta_r$, is made up of the high ordinance value $\theta_h$ and the low ordinance value $\theta_l$. $\theta_h$ and the step i may be the same number or offset by a fixed number. A more complete discussion of the IPE 40 and the electronics 42 for determining the motor rotor position may be found in the aforementioned patent application.

Figure 6:
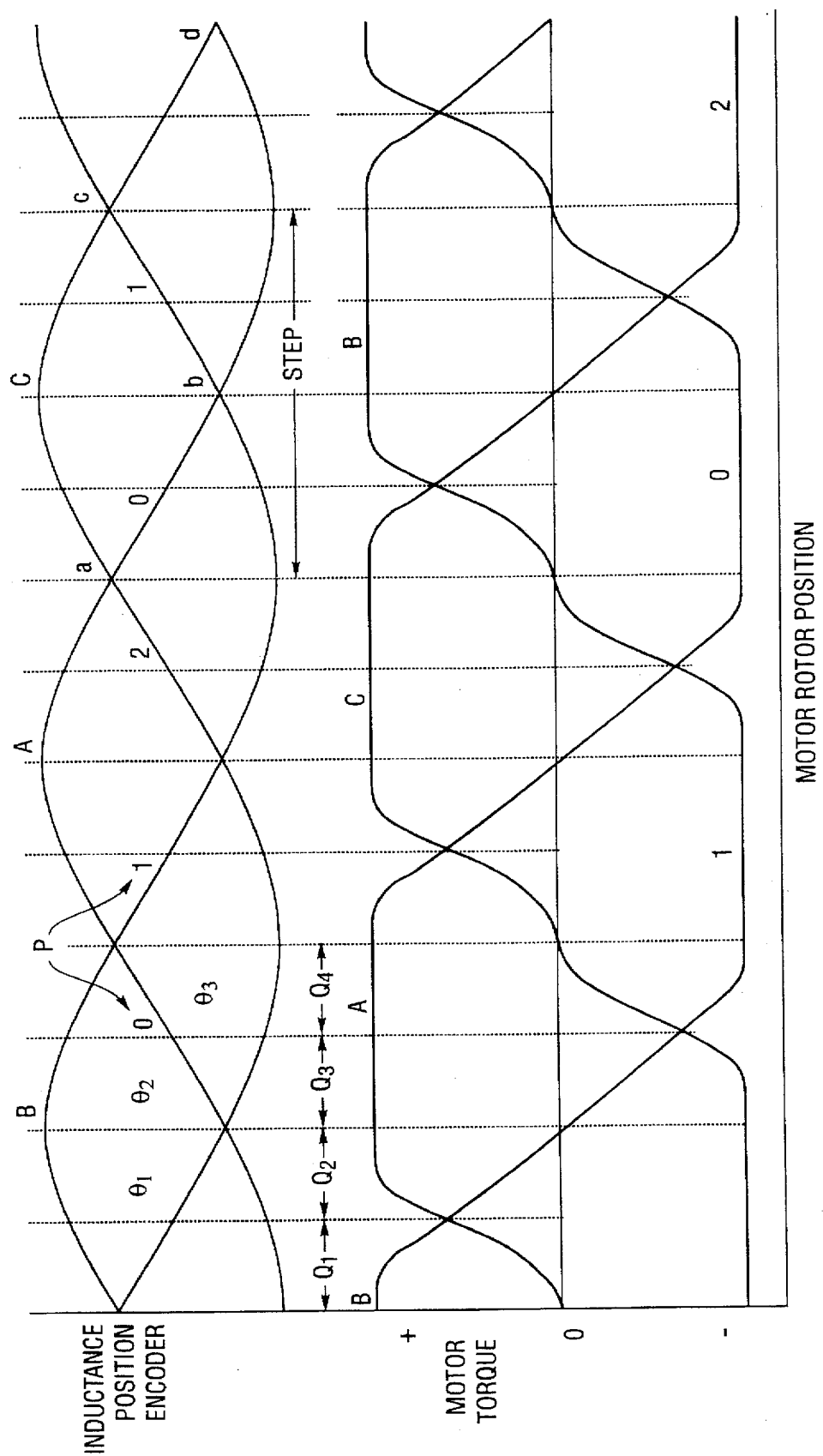
FIG. 6 shows the relationship of the position encoder in the system and the torque characteristics of the variable reluctance motor that positions the throttle.
Figure 7A:
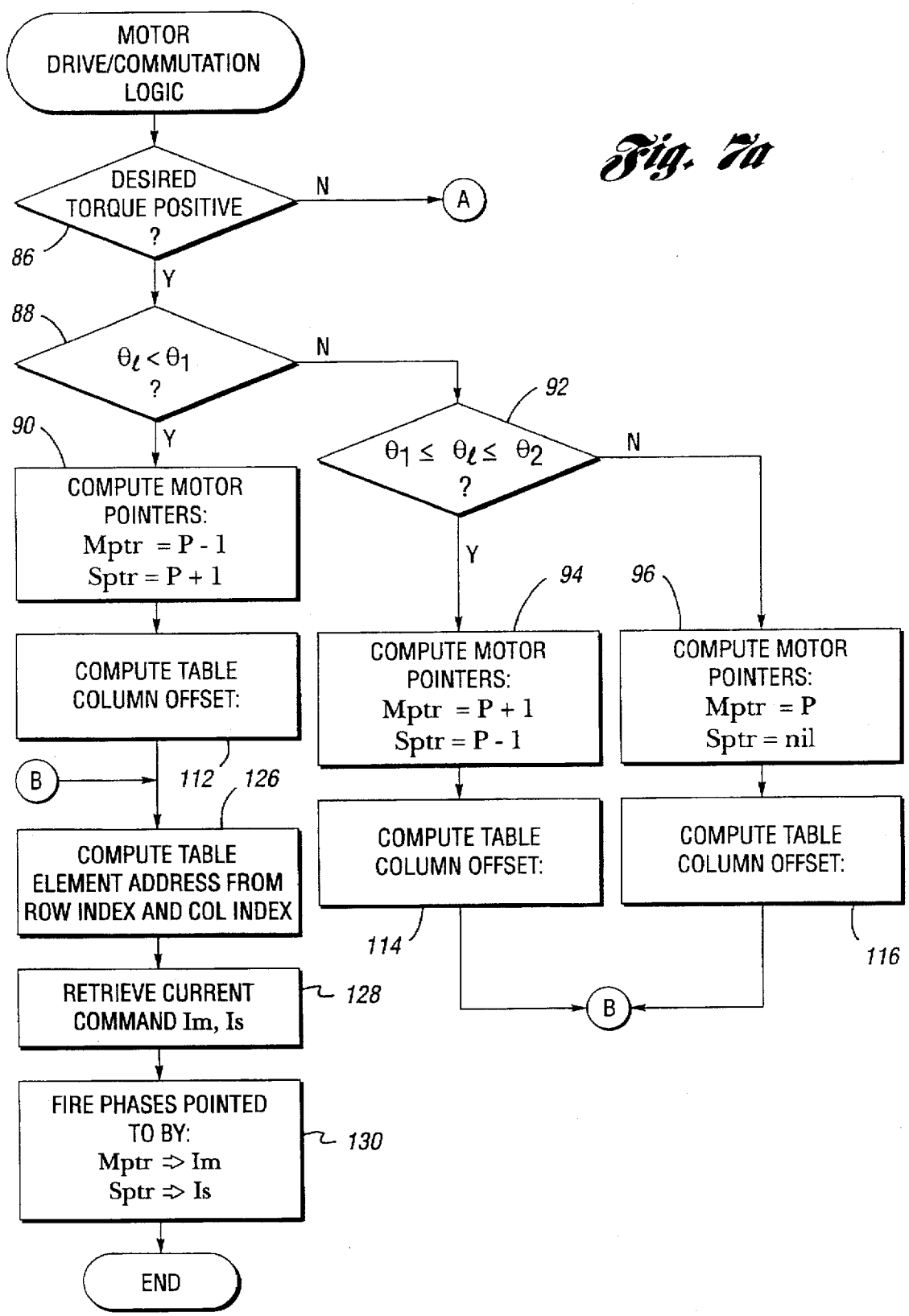
FIGS. 7a and 7b are flowcharts depicting use of the row index of FIG. 3, and a column index based on motor rotor position, to access main and secondary phase motor current look-up tables for driving the motor of the system.
Figure 7B:
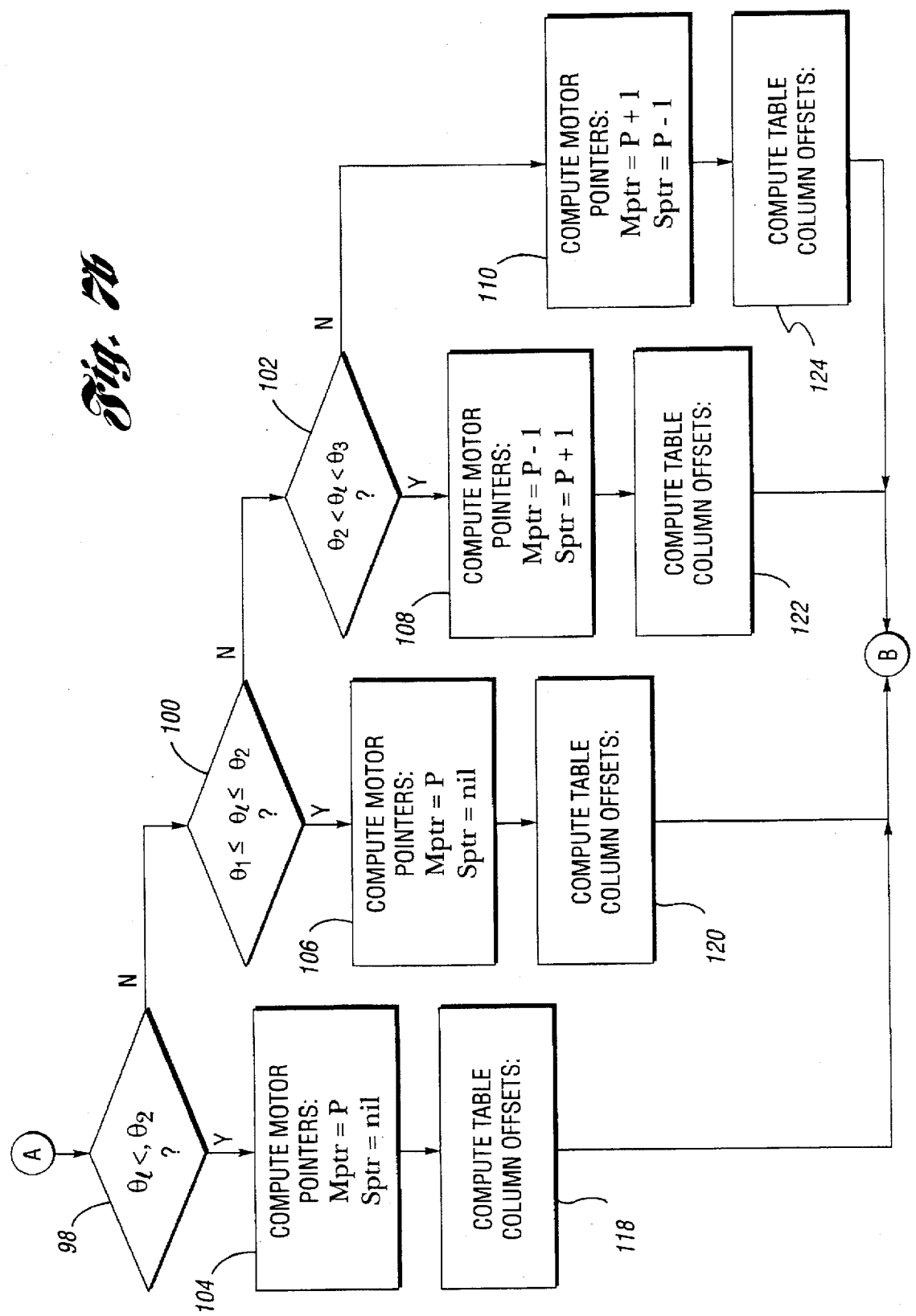

The flowcharts depicting the method of driving and commutating the motor are shown in FIGS. 7a and 7b. Essentially, the IPE phases are mapped to motor phases as shown in FIG. 6. A mapping scheme determines the motor drive current, for the appropriate motor phase, necessary to generate the desired motor torque to maintain the desired throttle plate position regardless of the throttle plate load. In the mapping scheme there are two motor phase pointers, namely, Mptr for main phase pointer (associated with main current table) and Sptr for secondary phase pointer (associated with secondary current table). The motor phase pointers are derived from the IPE phase pointer P, which will be 0, 1, or 2. The pointer P represents the middle position phase of the three inductance phases A, B, and C. The motor phases A, B, and C are also assigned values of 0, 1, or 2 respectively.

With reference to FIGS. 6, 7a and 7b, if the calculated desired torque is positive as determined by the decision block 86 and the calculated rotor position $\theta_l$ resides in quadrant Q1 of the step, i.e. is less than $\theta_1$, as indicated by decision block 88, then the motor phase pointers Mptr and Sptr are calculated in accordance with block 90. If the calculated rotor position is in quadrant Q2, as determined by decision block 92, then the motor phase pointers are calculated in block 94. If the rotor position is not in Q1 or Q2 then the motor phase pointers are calculated in block 96. In this case there is no secondary pointer Sptr, since the current to the secondary phase should be zero.

If the desired torque is negative as determined by decision block 86, then the rotor position is identified in decision blocks 98, 100, and 102 of FIG. 7b and the motor phase pointers are calculated in blocks 104, 106, 108, or 110. After the pointers identify the motor phases to be supplied with current, a column index is computed in appropriate blocks 112–124 and is input to block 126. The row index, calculated from the desired torque at block 84, is also input to block 126 in order to compute the table element address for the main and secondary current command tables. As previously indicated these tables contain the data from FIGS. 5a and 5b respectively. The current from the two tables is retrieved at block 128 and supplied to the motor phases identified by pointers Mptr and Sptr at block 130.

This closed loop scheme provides a highly efficient means of controlling the motor, supplying only enough phase current to the motor to maintain the load on the motor shaft, as opposed to the conventional approach of always setting the current in the VR motor phases for worst case loading.

While the best mode for carrying out the present invention has been described in detail, those familiar with the art to which this invention relates will recognize various alternative designs and embodiments for practicing the invention as defined by the following claims.

What is claimed is:

1. A system for positioning a device, comprising:

a multi-phase variable reluctance motor including a shaft coupled to said device for positioning said device in response to motor phase current command signals;

a multi-phase variable inductance position encoder rotatably coupled with said shaft;

encoder excitation circuit means electrically connected with said encoder for developing position signals defining the present angular position of said shaft;

a controller for calculating a desired motor torque based on a desired angular position input command, said present angular position, and the error between said present angular position and said desired angular position, said controller controlling the current applied to appropriate phases of the motor as a function of said present angular position and said desired motor torque to achieve said desired angular position.

2. The system defined in claim 1 wherein said controller includes memory storing main and secondary motor phase current data tables addressable from row and column indexes, the row index being calculated as a function of said desired torque and said column index being calculated as a function of said present angular position.

3. The system defined in claim 2 wherein said controller develops a pair of motor phase pointers for identifying main and secondary motor phases to be energized with main and secondary current values based on a predetermined mapping of the encoder phases to the motor phases.

4. A system for controlling a throttle of an internal combustion engine of a vehicle, comprising:

a multi-phase variable reluctance motor including a shaft coupled to said throttle for positioning said throttle in response to motor phase current command signals;

a multi-phase inductance position encoder rotatably coupled with said shaft;

encoder excitation circuit means electrically connected with said encoder for developing position signals defining the present angular position of said shaft;

a controller for calculating a desired motor torque based on (a) a desired angular position input command, (b) said present angular position, and (c) the error between said present angular position and said desired angular position, said controller controlling the current applied to appropriate phases of the motor as a function of said present angular position and said desired motor torque.

5. A method of controlling a multi-phase variable reluctance motor that positions the throttle of an internal combustion engine of a vehicle, comprising a sequence of the steps of:

detecting the present angular position of the shaft of the motor with a multi-phase inductance position encoder rotatably coupled with said shaft;

generating a desired angular position input command, computing a desired motor torque from said desired angular position, said present angular position, and the error between said present angular position and said desired angular position, and controlling the current applied to appropriate phases of said motor as a function of said present angular position and said desired motor torque.

* * * * *